United States Patent [19]

Hattori

[11] Patent Number: 4,457,699
[45] Date of Patent: Jul. 3, 1984

[54] VALVE MEANS FOR GAS LIGHTER

[75] Inventor: Tadamichi Hattori, Yokohama, Japan

[73] Assignee: Tokai Seiki Co., Ltd., Yokohama, Japan

[21] Appl. No.: 504,084

[22] Filed: Jun. 16, 1983

Related U.S. Application Data

[63] Continuation of Ser. No. 213,907, Dec. 8, 1980, abandoned.

[30] Foreign Application Priority Data

Dec. 10, 1979 [JP] Japan .................................. 54-160045

[51] Int. Cl.³ ............................................. F23D 13/04
[52] U.S. Cl. ................................... 431/344; 431/143; 431/277; 251/7; 222/3
[58] Field of Search .............. 431/344, 130, 131, 142, 431/143, 150, 276, 277, 254, 255; 222/3; 251/7, 8

[56] References Cited

U.S. PATENT DOCUMENTS

| | | | |
|---|---|---|---|
| 2,565,903 | 8/1951 | Zellweger | 431/344 |
| 3,240,034 | 3/1966 | Zellweger et al. | 431/130 |
| 3,305,144 | 2/1967 | Beres et al. | 251/7 |
| 3,998,364 | 12/1976 | Hollander | 251/7 |
| 4,172,580 | 10/1979 | Raftis et al. | 251/7 |

FOREIGN PATENT DOCUMENTS 1232587  5/1971  United Kingdom ................ 431/344

Primary Examiner—James C. Yeung

[57] ABSTRACT

A valve for a cigaret gas lighter is comprised of a flexible gas conduit extending between a nozzle and a gas tank. The flexible gas conduit is pinched or bent to close the conduit. An operating member pinches or bends the gas conduit to close the conduit by a spring. A manually operable lever is provided to open the conduit by removing the operating member overcoming the spring force. In a preferred embodiment of the invention, the conduit is positively opened in addition to removal of the operating member when the gas lighter is to be ignited.

7 Claims, 13 Drawing Figures

VALVE MEANS FOR GAS LIGHTER

This application is a continuation, of application Ser. No. 213,907, filed Dec. 8, 1980, now abandoned.

BACKGROUND OF THE INVENTION

1. Field of the Invention

This invention relates to a gas lighter, and more particularly to an improvement in a valve means for a cigaret gas lighter mainly made of plastics.

2. Description of the Prior Art

The simple structured conventional plastic cigaret gas lighter normally of disposable type has a complicated valve means which consists of a nozzle, a nozzle housing having a bottom opening, a valve rubber mounted on the bottom opening, a spring for urging the nozzle to the closed position, a stud element partly inserted into the bottom opening, and a filter. The valve means having such a complicated structure and consisting of such a great number of parts requires much labor and cost for producing those parts and assembling the same. Further, since the closure of the valve or the seal of the gas is accomplished by an annular contact line between the valve rubber and the valve seat at the bottom opening of the nozzle housing, the surfaces of these parts must be smoothly finished to effect reliable sealing. Further, various parts incorporated in the valve means should be precisely located at predetermined positions in the predetermined relationship with other parts. Therefore, these parts should be finished very precisely by cutting work and the like. Due to the precise processing thus required in manufacturing the valve means, holding down the cost of the gas lighter of this type cannot be sufficiently accomplished. In addition, since the above-mentioned valve structure has a very precise dimension and clearances, the valve cannot be used if some dust or fibers enter the valve structure during the manufacturing process. Therefore, the yield of the valve means and accordingly the yield of the gas lighter cannot be made large.

SUMMARY OF THE INVENTION

The primary object of the present invention is to provide a novel valve means for use in a cigaret gas lighter which can be manufactured at a very low cost.

Another object of the present invention is to provide a valve means for use in a cigaret gas lighter which is free of the above mentioned drawbacks.

A more specific object of the present invention is to provide a novel valve means for use in a cigaret gas lighter which merely consists of a flexible gas conduit and a pinch means for closing the conduit from outside the conduit.

The novel valve means in accordance with the present invention is characterized in that, completely differently from the conventional valve means, a nozzle and a liquid gas tank are communicated through a flexible conduit, like a rubber tube, and the flexible conduit working as a valve tube is provided with a valve closing means which pinches the flexible conduit or bends the same to close the conduit. In a preferred embodiment of the present invention, there is also provided a valve conduit opening means which positively acts to open the valve conduit upon release of the valve closing means for ensuring the opening of the valve conduit.

In the gas lighter provided with the valve means in accordance with the present invention, there is provided a lever which is manually operable to open and close the valve conduit to allow and stop the gas flow from the gas tank to the nozzle.

In accordance with the present invention, the valve means only consists of the flexible conduit and means for opening and closing the conduit. Therefore, the number of the parts constituting the valve is very small and accordingly the cost of manufacturing thereof can be markedly reduced. Further, since the structure is so simple, there is little problem in assembling the parts and accordingly there is little fear of dust entering the valve structure, and consequently the yield in the manufacture of the valve means can be much increased. In addition, since the closure of the conduit is made by pinching or bending the conduit itself and accordingly the area of contact of the internal wall of the conduit can be made large, the closure of the conduit can be perfectly performed even if dust enters the conduit. In the preferred embodiment of the invention, since the flexible conduit is positively opened or forced to open by an opening operation, there is no problem of sticking of the internal wall of the flexible conduit even after long closure of the conduit.

DESCRIPTION OF THE PREFERRED EMBODIMENTS

Now the present invention will be described in detail with reference to accompanying drawings.

Figure 1:
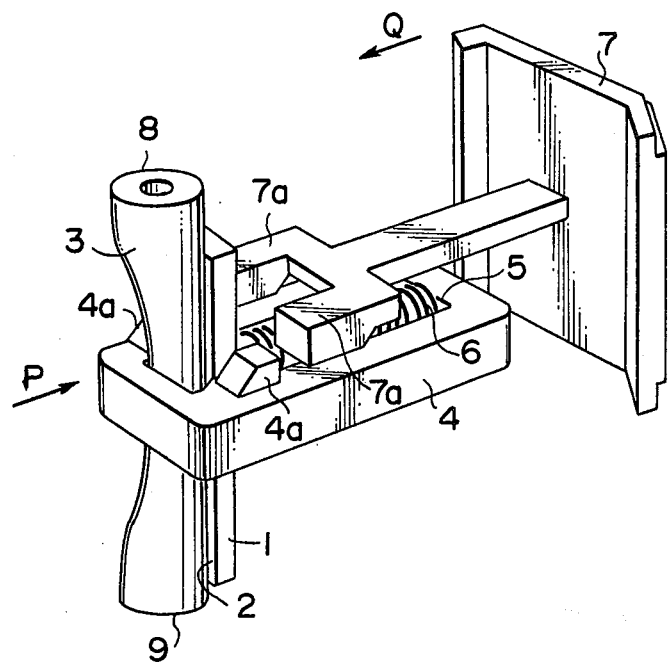
FIG. 1 is a perspective view showing an embodiment of the valve means in accordance with the present invention in which the gas conduit is closed.
Figure 2:
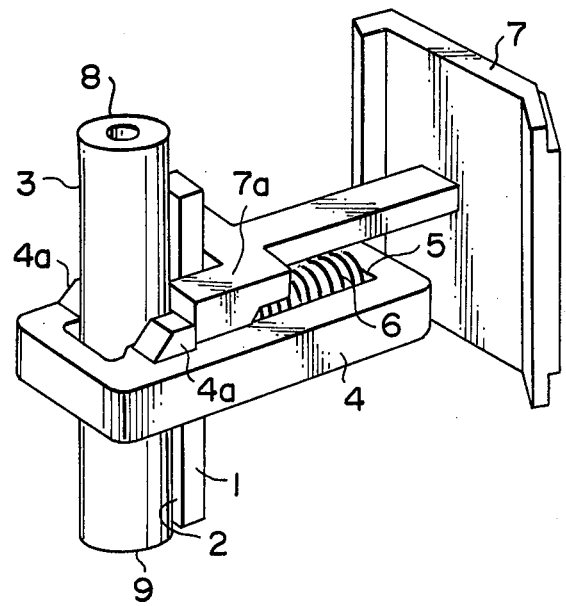
FIG. 2 is a perspective view showing another state of the valve means as shown in FIG. 1 in which the gas conduit is opened.
Figure 3:
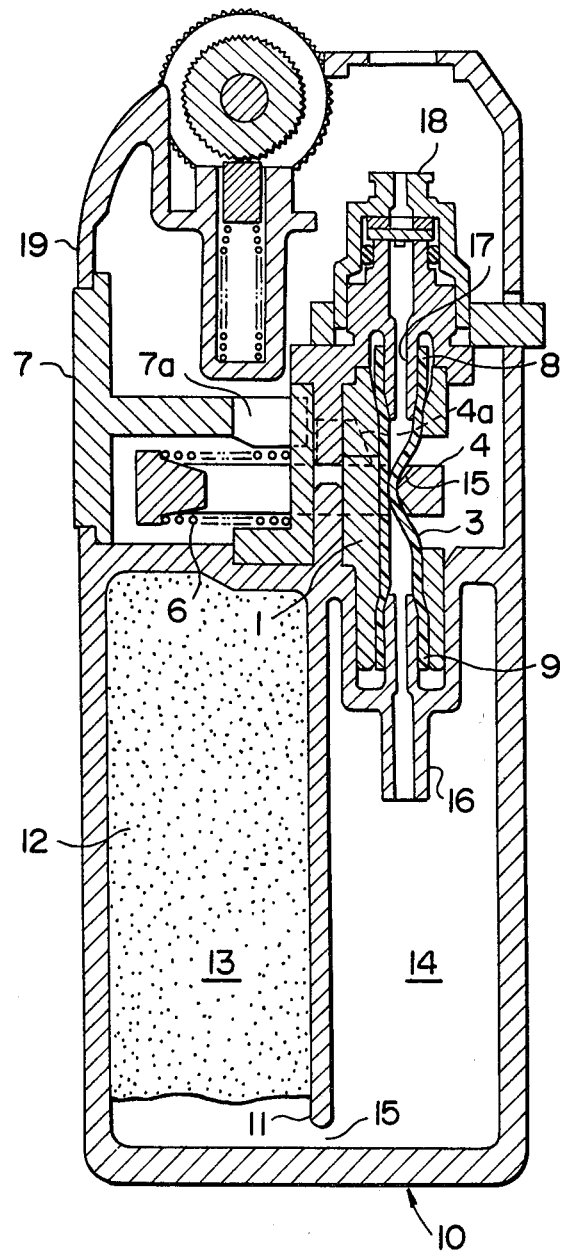
FIG. 3 is a vertical sectional view of a cigaret gas lighter provided with a valve means in accordance with the embodiment of the present invention as shown in FIGS. 1 and 2.
Figure 4:
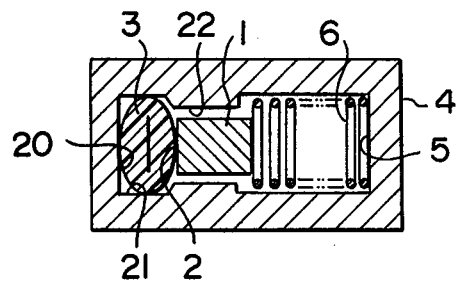
FIG. 4 is a cross sectional view of the valve means shown in FIG. 1 in which the gas conduit is closed.
Figure 5:
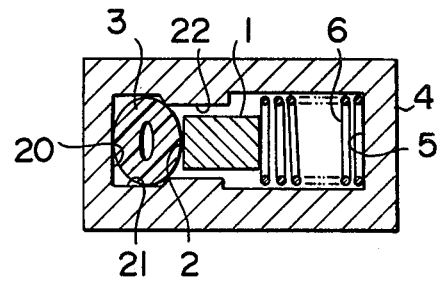
FIG. 5 is a cross sectional view of the valve means shown in FIG. 1 in which the gas conduit is half opened.
Figure 6:
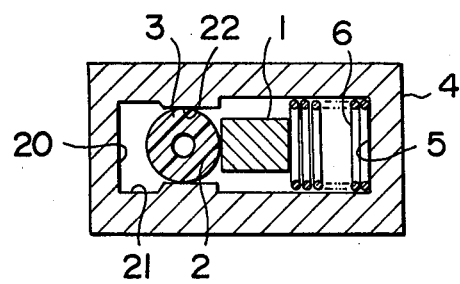
FIG. 6 is a cross sectional view of the valve means shown in FIG. 1 in which the gas conduit is fully opened.

FIGS. 1 to 6 show an embodiment of the present invention, in which FIGS. 1, 3 and 4 show the state where the gas conduit is closed and FIGS. 2 and 6 show the state where the gas conduit is opened. A support portion 1 integrally formed with the body of a gas lighter supports a valve conduit 3 by its side face 2. The valve conduit 3 is a rubber tube and it and the support portion 1 are vertically provided to extend through a rectangular frame shaped pressing member 4. A compression spring 6 is provided between one internal end face 5 of the pressing member 4 and the support portion 1 for spring and urges the pressing member 4 in the direction of the arrow P in FIG. 1 to pinch the conduit 3 between the pressing member 4 and the support member 1 and close the conduit 3. Outside the pressing member 4 there is provided a lever 7 which is mounted on the body of the gas lighter and movable in the direction of arrow Q in FIG. 1. When the lever 7 is depressed from outside in the direction Q, a forked end 7a of the lever 7 formed at an internal end thereof pushes two projections 4a on the pressing member 4 in the direction Q and moves the pressing member 4 in the same direction. Then, the valve conduit 3 is released from the pressing member 4 to open as shown in FIG. 2. The upper end 8 of the valve conduit 3 is connected to a nozzle of the gas lighter and the lower end 9 thereof is connected to a gas tank of the gas lighter.

FIG. 3 shows an example of a cigaret gas lighter employing the above embodiment of the valve means of the present invention. A gas tank 10 is divided into two chambers 13 and 14 by a partition 11 in one of which 13 is stored a liquefied gas in a polyurethane foam 12 impregnated therewith and in the other of which 14 is stored a vaporized gas. These two chambers 13 and 14 communicate with each other by way of an air gap 15 formed at the lower end of the partition 11. In the gas chamber 14 is opened the lower end 16 of a gas intake pipe 16. The upper end of the gas intake pipe 16 is connected with the lower end 9 of the gas conduit 3. The upper end 8 of the gas conduit 3 is connected with a tubular portion of a nozzle bottom 17 to form a gas flow passage between the gas chamber 14 and the nozzle 18 provided on the nozzle bottom 17. The middle portion of the valve conduit 3 extends through the frame shaped pressing member 4. The lever 7 for operating the pressing member 4 is made to form a part of the outer wall 19 of the body of the gas lighter and is movable to the right in FIG. 3. When the lever 7 is depressed to the right in FIG. 3, the valve conduit 3 is opened and the fuel liquefied gas is supplied to the nozzle 17. At this point, the lighter is ignited by rotating a sparking wheel mounted on the top of the gas lighter. All the parts mentioned above except the spring 6 are made of plastics and made of plastic molding. The valve conduit 3 is made of rubber.

Now the operation of the pressing member 4 of the valve means of the above mentioned embodiment will be described in detail referring to FIGS. 4 to 6.

FIG. 4 shows the closed state, FIG. 5 shows the half opened state and FIG. 6 shows the fully opened state of the valve means as shown in FIGS. 1 to 3. In FIG. 4, the pressing member 4 is urged to the right position by means of the compression spring 6 and the conduit 3 is pinched between the internal abutment face 20 of the pressing member 4 and the side face 2 of the support portion 1. Thus, the valve conduit 3 is in the closed state and positioned in the retaining portion 21 of the pressing member 4. When the pressing member 4 is moved to the left as shown in FIG. 5, the distance between the abutment face 20 of the pressing member 4 and the side face 2 of the support portion 1 is enlarged and the valve conduit 3 recovers its original shape by its elasticity. As the pressing member 4 is further moved to the left as shown in FIG. 6, the abutment face 20 is completely separated from the conduit 3 and further the conduit 3 is laterally pressed slightly by side walls 22 of the pressing member 4 to be forced to open to its full open size. Thus, the valve conduit 3 is fully open even if the internal walls of the conduit 3 stick to each other after long closure of the conduit.

Figure 13:
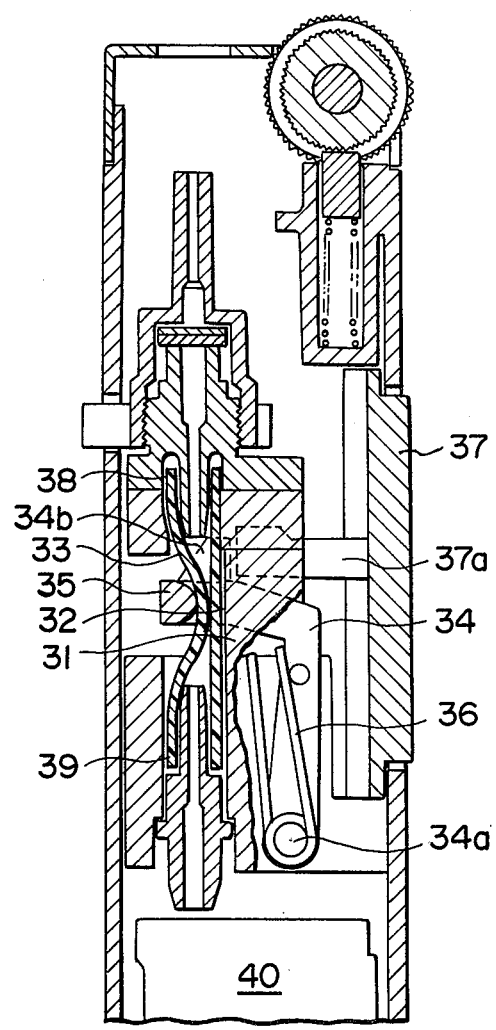
FIG. 13 is a partial vertical sectional view showing a further embodiment of the present invention in which the gas conduit is closed.

FIG. 13 shows another embodiment similar to the above embodiment as shown in FIGS. 1 to 6. A support portion 31 has a side face 32 similar to the side face 2 of the support portion 1 of the above embodiment. A flexible valve conduit 33 extends through a pressing member 34 having a frame shape and the upper end thereof 38 is connected to a nozzle and the lower end thereof 39 is connected to a gas tank 40 provided therebelow. The pressing member 34 is pivotally mounted in the gas lighter to rotate about an axle 34a and spring urged clockwise in FIG. 13 by a spring 36. The pressing member 34 has a projection 34b fixed on top thereof which is in abutment engagement with an internal projection 37a of a manually depressible lever 37. When the gas lighter is gripped and the lever 37 is depressed by a part of a hand or a finger, the projection 37a pushes the projection 34b leftward and the pressing member 34 rotates slightly counterclockwise overcoming the spring force of the spring 36. Then, the conduit 33 is opened because the pressing portion 35 of the pressing member 34 is moved away from valve conduit 33. When the lever 37 is released by removing the hand therefrom, the pressing member 34 returns to its original position and pressed the valve conduit 33 against the side face 32 of the support portion 31.

In the above embodiment as shown in FIG. 13, it is not clearly shown that the pressing member 34 has the valve opening means like said side walls 22 of the first embodiment as shown in FIGS. 4 to 6. It should be understood that the pressing member 34 may be provided with such side walls, too. However, the side walls for forcing the valve conduit 33 to open may not be provided. In such a case also, the valve conduit 33 opens by its self-recovering force or its elasticity.

It is possible to provide the valve conduit closing means separately from the valve conduit opening means. One of such examples will be described referring to FIGS. 7 to 9.

Figure 7:
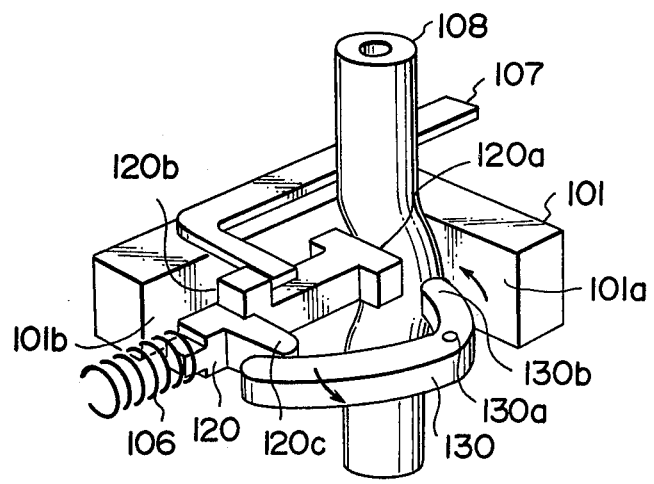
FIG. 7 is a perspective view showing another embodiment of the valve means in accordance with the present invention.
Figure 8:
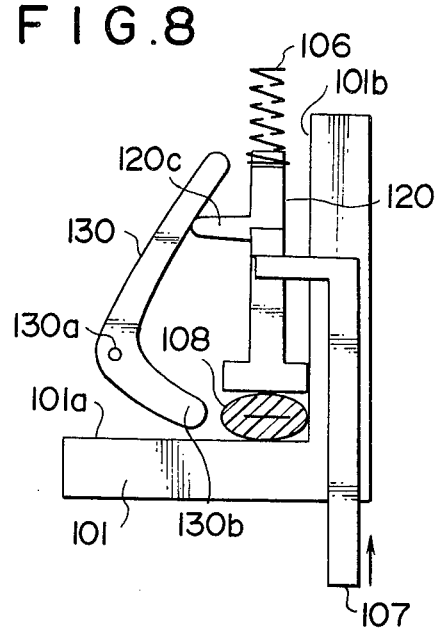
FIG. 8 is a cross sectional view of the valve means shown in FIG. 7 in which the gas conduit is closed.
Figure 9:
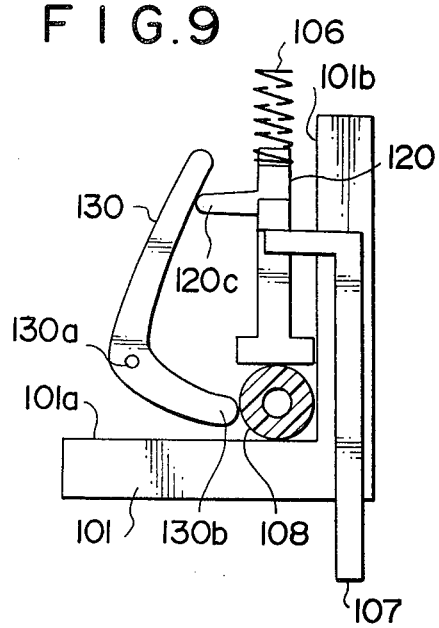
FIG. 9 is a cross sectional view of the valve means shown in FIG. 7 in which the gas conduit is opened.

Referring to FIGS. 7 to 9, a valve conduit 108 extends by a corner of an L-shaped support portion 101 of the gas lighter. The valve conduit 108 is made of synthetic rubber. The valve conduit 108 is sandwiched between one internal face 101a of the L-shaped support portion 101 and a pressing face 120a of a pressing member 120 which is spring urged toward the face 101a and normally pinches the valve conduit 108 therebetween to close the same. Further, the valve conduit 108 is sandwiched between the other internal face 101b of the L-shaped support portion 101 and an opening end 130b of an opening lever 130 pivotally mounted near the valve conduit 108. The pressing member 120 is spring urged by a compression spring 106 and is provided on the top face thereof with a projection 120b to be engaged with a manual lever 107 so as to be pushed apart from the L shaped support portion 101 by the manual lever 107. The pressing member 120 is further provided on the side face thereof with a laterally projecting portion 120c. The tip of the laterally projecting portion 120c is slidably engaged with an arm of said opening lever 130. The opening lever 130 is pivotally mounted on a pivot 130a and is rotated in the arrowed direction in FIG. 7 when the pressing member 120 is moved apart from the L-shaped support portion 101 by the manual lever 107. The relationship between the opening lever 130 and the pressing member 120 is clearly shown in FIGS. 8 and 9. As the pressing member 120 is moved away from the first face 101a of the L-shaped support portion 101 to release the valve conduit 108, the opening lever 130 rotates counterclockwise to force the valve conduit to open with its end 130b as shown in FIG. 9, and vice versa.

In the above embodiments, the valve conduit is pinched to close the gas flow path. It is possible to bend the valve conduit to close the gas flow path. One example of such a mechanism will be described referring to FIGS. 10 and 11, hereinbelow.

Figure 10:
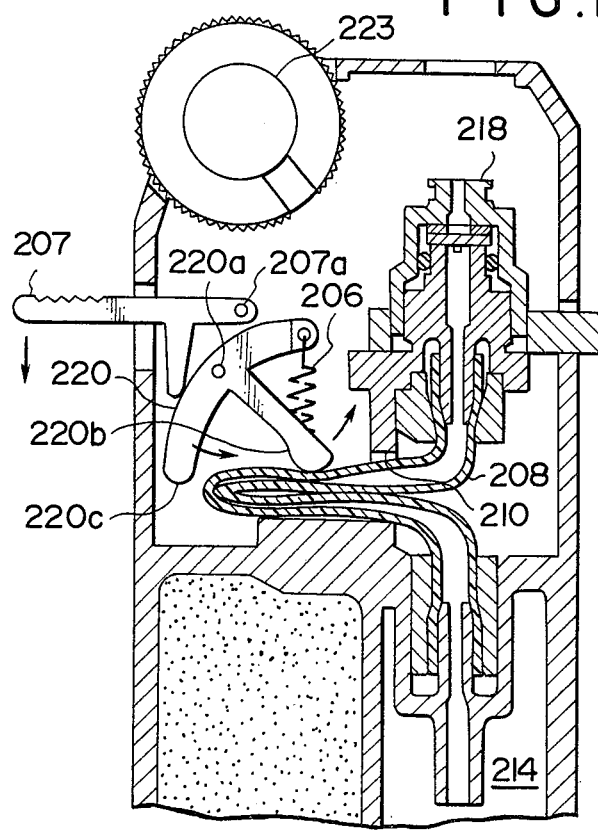
FIG. 10 is a partial vertical sectional view showing still another embodiment of the present invention in which the gas conduit is closed.
Figure 11:
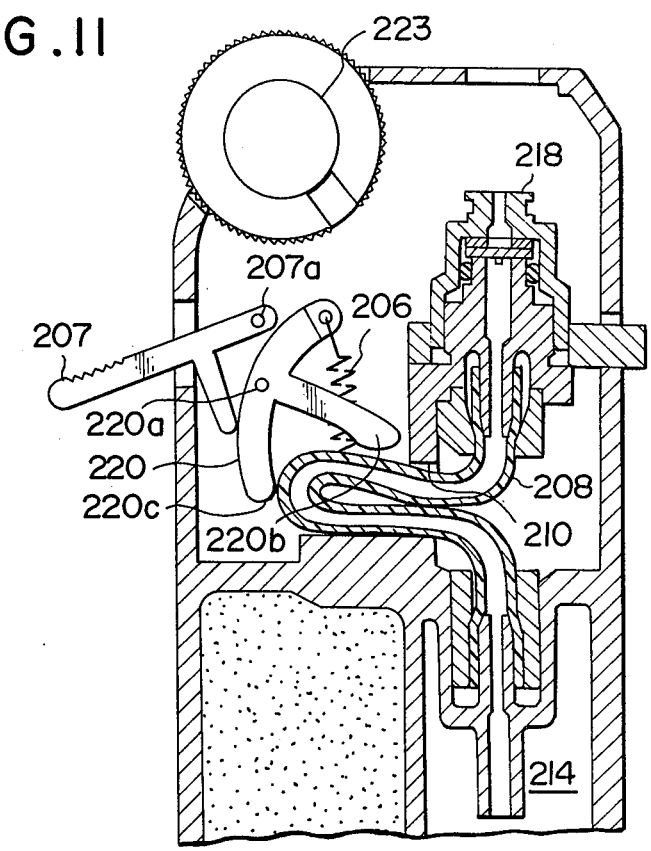
FIG. 11 is a partial vertical sectional view showing another state of the valve means as shown in FIG. 10 in which the gas conduit is opened.

Referring to FIGS. 10 and 11, a valve conduit 208 extending between a gas chamber 214 and a nozzle 218 runs in a detour through an opening 210. A pressing member 220 is pivotally mounted in the gas lighter about a pivot 220a. The pressing member 220 has three arms one of which 220b extends over the detour portion of the valve conduit 208, another of which 220c is in slidable engagement with a part of an operating lever 207 pivotally mounted on a pivot 207a, and the other of which is engaged with a spring 206 to spring urge the pressing member clockwise to bend the detour portion of the valve conduit 208 with the first arm 220b. The second arm 220c of the member 220 is moved to the right in FIG. 10 by the part of the operating lever 207 when the lever 207 is depressed by a finger or the like and the pressing member 220 is rotated counterclockwise to move the first arm 220b apart from the detour portion of the valve conduit 208. The operating lever 207 is depressed or swung counterclockwise by a finger which has rotated a sparking wheel 223. Therefore, when the user of the gas lighter rotates, the sparking wheel 223 counterclockwise in FIG. 10 and depresses the lever 207 to swing it counterclockwise, the pressing member 220 is rotated counterclockwise to remove the first arm 220b away from the detour portion of the valve conduit 208. Therefore, by this operation, the valve conduit is opened to allow gas to flow therethrough up to the nozzle 218 and the gas lighter is ignited. In this embodiment also, only the spring 206 is made of metal and all the other parts are made of plastics.

This embodiment is advantageous in that the sparking operation and the valve opening operation are combined so that ignition can be made by one action. It will be understood, however, that in the former embodiment also it is possible to make the two operations combined like this embodiment simply by arranging the valve opening lever in the vicinity of the sparking wheel in the shape as the one employed in the embodiment of FIGS. 10 and 11.

In the above embodiments, the operating lever manually actuated by the user of the gas lighter and the valve conduit closing and opening member or members are separately arranged. It is possible to combine all these elements together into one member. Such an example is shown in FIG. 12.

Figure 12:
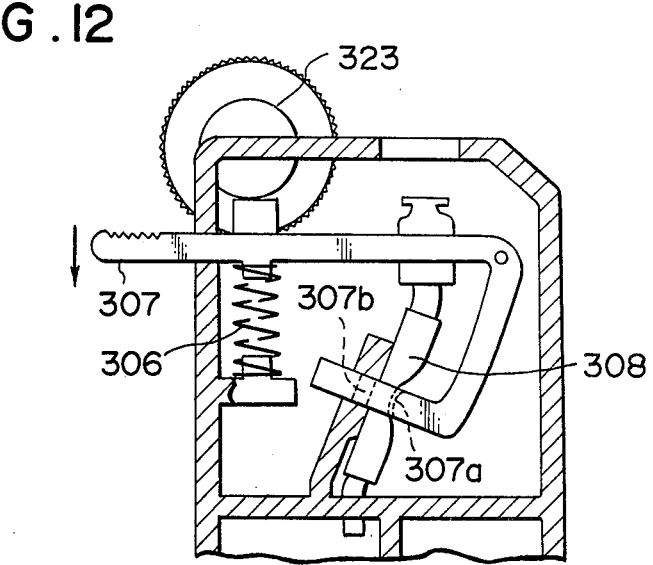
FIG. 12 is a partial vertical sectional view showing still another embodiment of the present invention in which the gas conduit is closed.

Referring to FIG. 12, an operating lever 307 is positioned below the sparking wheel so as to be depressed by the finger used to rotate the sparking wheel 323. The lever 307 is pivotally mounted in the gas lighter so that one arm thereof is moved about the pivot when the outwardly projecting arm below the sparking wheel 323 is depressed. The arm within the gas lighter has the same shape as that of the pressing member 4 in the first embodiment as shown in FIGS. 4 to 6, and has a valve conduit pressing portion 307a to close the conduit 308 and a valve opening portion 307b like the side walls 22 of the pressing member 4 of the first embodiment. When the lever 307 is depressed and swung counterclockwise, the inside arm is moved to the left along an arcuate path about the pivot of the lever 307 and the pressing portion 307a is removed from the valve conduit 308 and the valve conduit opening portion 307b opens the conduit 308 as the pressing member 4 in the first embodiment does. When the lever 307 is released, the lever is swung back in the clockwise direction being urged by a spring 306 which normally urges the lever 307 upward.

In the present invention, the valve conduit should preferably be made of synthetic rubber and have a thick wall so that the closure can be well performed. For instance, when the inner diameter is 1 mm, the wall thickness should preferably be also as large as about 1 mm.

In the above mentioned preferred embodiments, the pressing member is provided both with a valve conduit closing portion and a valve conduit opening portion. However, it should be understood that the pressing member may only have the pressing portion to close the valve conduit and may not be provided with the valve opening portion for forcing the conduit to open since the valve conduit is generally able to recover its open shape by its elasticity.

I claim:

1. A valve means for use in a gas lighter having a gas tank to be filled with liquefied fuel gas, an ignition means located on the gas tank, and a nozzle located close to the ignition means for spouting the fuel gas from the gas tank in front of the ignition means, said valve means comprising a valve conduit connected between the gas tank and the nozzle for making communication therebetween, said valve conduit being made of elastic material and capable of closing its flow path formed therein by operation from outside, a pressing member movable between a closing position to effect upon the valve conduit to close its flow path and an opening position to release the valve conduit to allow the conduit to recover its original form to open the flow path due to its elasticity, means integral with said pressing member for forcing the valve conduit to open when said pressing member is in said opening position, said pressing member comprising a pressing portion for pressing the valve conduit against a fixed face to close the conduit, a valve retaining portion for receiving the valve conduit when the conduit is pressed and closed, and a valve conduit opening portion located adjacent the valve retaining portion for forcing the valve conduit to open, said valve conduit opening portion comprising a pair of walls having a space therebetween slightly smaller than the outer diameter of the valve conduit, and a manually operable actuating lever operable from outside for moving said pressing member between said closing position and said opening position.

2. A valve means for use in a gas lighter as defined in claim 1 wherein said valve conduit is made of synthetic rubber.

3. A valve means for use in a gas lighter which consists of a gas tank filled with liquefied fuel gas, an ignition means located on the gas tank, and a nozzle located close to the ignition means for spouting the fuel gas from the gas tank in front of the ignition means, said valve means comprising a valve conduit connected between the gas tank and the nozzle for making communication therebetween, said valve conduit being made of elastic material and capable of closing its flow path formed therein by operation from outside, a pressing member movable between a closing position to act upon the valve conduit to close its flow path in a first direction and an opening position to release the valve conduit to allow the conduit to recover its original form to open the flow path in a second direction substantially perpendicular to said first direction by its elasticity, a manually operable actuating lever operable from outside for moving said pressing member between said closing position and said opening position, and means for forcing the valve conduit to open when said pressing member is in said opening position by pressing the conduit in said second direction, said means for forcing the valve conduit to open being integral with said pressing member, said pressing member comprising a pressing portion for pressing the valve conduit against a fixed face to close the conduit, a valve retaining portion for receiving the valve conduit when the conduit is pressed and closed, and a valve conduit opening portion located adjacent the valve retaining portion for forcing the valve conduit to open, said valve conduit opening portion comprising a pair of walls having a space therebetween slightly smaller than the outer diameter of the valve conduit.

4. A valve means for use in a gas lighter as defined in claim 3 wherein said valve conduit is made of synthetic rubber.

5. A valve means for use in a gas lighter as defined in claim 3 or 4 wherein said pressing member presses the valve conduit against a fixed portion to pinch the valve conduit therebetween to close the flow path therethrough in said closing position.

6. A valve means for use in a gas lighter as defined in claim 3 or 4 wherein said pressing member bends the valve conduit to close the flow path therethrough in said closing position.

7. A valve means for use in a gas lighter as defined in claim 3 wherein said means for forcing the valve conduit to open is made integrally with said pressing member and said manually operable actuating lever.

* * * * *